United States Patent
Shibata et al.

(10) Patent No.: US 10,054,679 B2
(45) Date of Patent: Aug. 21, 2018

(54) RADAR SYSTEM INCLUDING FIRST RADAR DEVICE AND SECOND RADAR DEVICE

(71) Applicant: Panasonic Intellectual Property Management Co., Ltd., Osaka (JP)

(72) Inventors: Osamu Shibata, Kanagawa (JP); Yoshiyuki Saito, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 428 days.

(21) Appl. No.: 14/920,803

(22) Filed: Oct. 22, 2015

(65) Prior Publication Data

US 2016/0187479 A1 Jun. 30, 2016

(30) Foreign Application Priority Data

Dec. 24, 2014 (JP) .................... 2014-261190

(51) Int. Cl.
| | |
|---|---|
| *G01S 13/87* | (2006.01) |
| *G01S 13/93* | (2006.01) |
| *G01S 7/02* | (2006.01) |
| *G01S 13/32* | (2006.01) |
| *G01S 13/42* | (2006.01) |

(52) U.S. Cl.
CPC .............. *G01S 13/87* (2013.01); *G01S 7/023* (2013.01); *G01S 13/325* (2013.01); *G01S 13/426* (2013.01); *G01S 13/878* (2013.01); *G01S 13/931* (2013.01); *G01S 2013/9375* (2013.01)

(58) Field of Classification Search
CPC ...... G01S 13/325; G01S 13/426; G01S 13/87; G01S 13/878; G01S 13/931; G01S 2013/9375; G01S 7/023
USPC .......................................... 342/59
See application file for complete search history.

(56) References Cited

U.S. PATENT DOCUMENTS

2004/0150548 A1* 8/2004 Walmsley ................ G01S 7/35
342/70
2015/0009485 A1* 1/2015 Mheen ................... G01S 17/87
356/4.01

FOREIGN PATENT DOCUMENTS

JP     2003-248056    9/2003

* cited by examiner

*Primary Examiner* — Timothy A Brainard
(74) *Attorney, Agent, or Firm* — McDermott Will & Emery LLP (57) ABSTRACT

A radar system includes: control circuitry that generates a beam control signal; a first radar device including a first transmission antenna and first beam formation circuitry that causes the first transmission antenna to perform a first scan including a second scan from left to right by changing an emission angle and a third scan from right to left by changing an emission angle in such a manner that a part of the second scan and a part of the third scan are performed alternately one after another; and a second radar device including a second transmission antenna and second beam formation circuitry that cause the second transmission antenna to perform a fourth scan in such a manner that a phase of the fourth scan is opposite to a phase of the first scan.

10 Claims, 5 Drawing Sheets

RADAR SYSTEM INCLUDING FIRST RADAR DEVICE AND SECOND RADAR DEVICE

BACKGROUND

1. Technical Field

The present disclosure relates to a radar system including a first radar device and a second radar device.

2. Description of the Related Art

Techniques for enhancing safety by detecting an object present ahead using a vehicle-mounted radar device and operating an alarm, an automatic brake, and automatic steering have been developed in recent years.

For example, Japanese Unexamined Patent Application Publication No. 2003-248056 discloses a radar system that detects an object using a first beam for sequential scanning from one scanning end to the other scanning end and a second beam for sequential scanning from the other scanning end to the one scanning end, which can ensure a sufficient intersection region of the two beams.

SUMMARY

One non-limiting and exemplary embodiment provides a radar system capable of detecting an object.

In one general aspect, the techniques disclosed here feature a radar system including: control circuitry that generates a beam control signal; a first radar device including (i) a first transmission antenna that transmits a first transmission signal by using a first beam and a second beam to detect an object, and (ii) first beam formation circuitry that, in accordance with the beam control signal, causes the first transmission antenna to perform a first scan including a second scan from left to right by changing an emission angle of the first beam, whereas a predetermined front direction is centrally positioned, and a third scan from right to left by changing an emission angle of the second beam, whereas the front direction is centrally positioned, in such a manner that a part of the second scan and a part of the third scan are performed alternately one after another; and a second radar device including (iii) a second transmission antenna that transmits a second transmission signal to detect the object, and (iv) second beam formation circuitry that, in accordance with the beam control signal, cause the second transmission antenna to perform a fourth scan in such a manner that a phase of the fourth scan is opposite to a phase of the first scan.

It should be noted that general or specific embodiments may be implemented as an object detection device, a device, an apparatus, a system, a method, an integrated circuit, a computer program, a storage medium, or any selective combination thereof. The radar system according to an embodiment of the present disclosure enables detection of an object.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

[Underlying Knowledge Forming Basis of Present Disclosure]

According to a conventional radar system, an object is detected simply by sequentially directing respective beams from two antennas from one end to the other end so that the beams have opposite phases, and thus, an interval between a timing at which the emission areas of the two beams overlap and a timing at which the emission areas of the two beams overlap again is long. That is, the timing during which the emission areas of the two beams do not overlap each other lasts long. The present inventors have found that increase in the length of a timing during which the emission areas of beams from two antennas do not overlap each other causes decrease in the accuracy of object detection and the accuracy of fault detection.

Thus, the present inventors have assiduously studied to provide a radar system capable of detecting an object with reliability using a plurality of antennas by shortening each of timings during which the emission areas of beams from the plurality of antennas do not overlap each other. A radar system according to an embodiment of the present disclosure can shorten each of the timings during which no object can be detected using a plurality of antennas, compared to conventional techniques, and thus, an object can be detected with high accuracy, compared to conventional techniques. Further, since each of the timings during which no object can be detected at the same time using a plurality of antennas can be shortened, a fault can be determined with higher accuracy.

The embodiment according to the present disclosure is described below with reference to the drawings. In each of the embodiment and variations thereof described below, the same references are given to the same or similar constituent elements and the explanations on such constituent elements are omitted.

Embodiment

According to conventional techniques to detect an object present in a direction ahead of a vehicle by moving two beams so that the beams have opposite phases, each of the lengths of timings at which the two beams do not overlap is long. Thus, timings for detecting an object by using two beams cannot be properly ensured. In contrast, according to a radar system 1 of an embodiment of the present disclosure, each of the lengths of timings at which two beams do not overlap can be made shorter than that according to the conventional techniques. Thus, an object present in a direction ahead of a vehicle can be detected with high accuracy, compared to conventional techniques.

Figure 1:
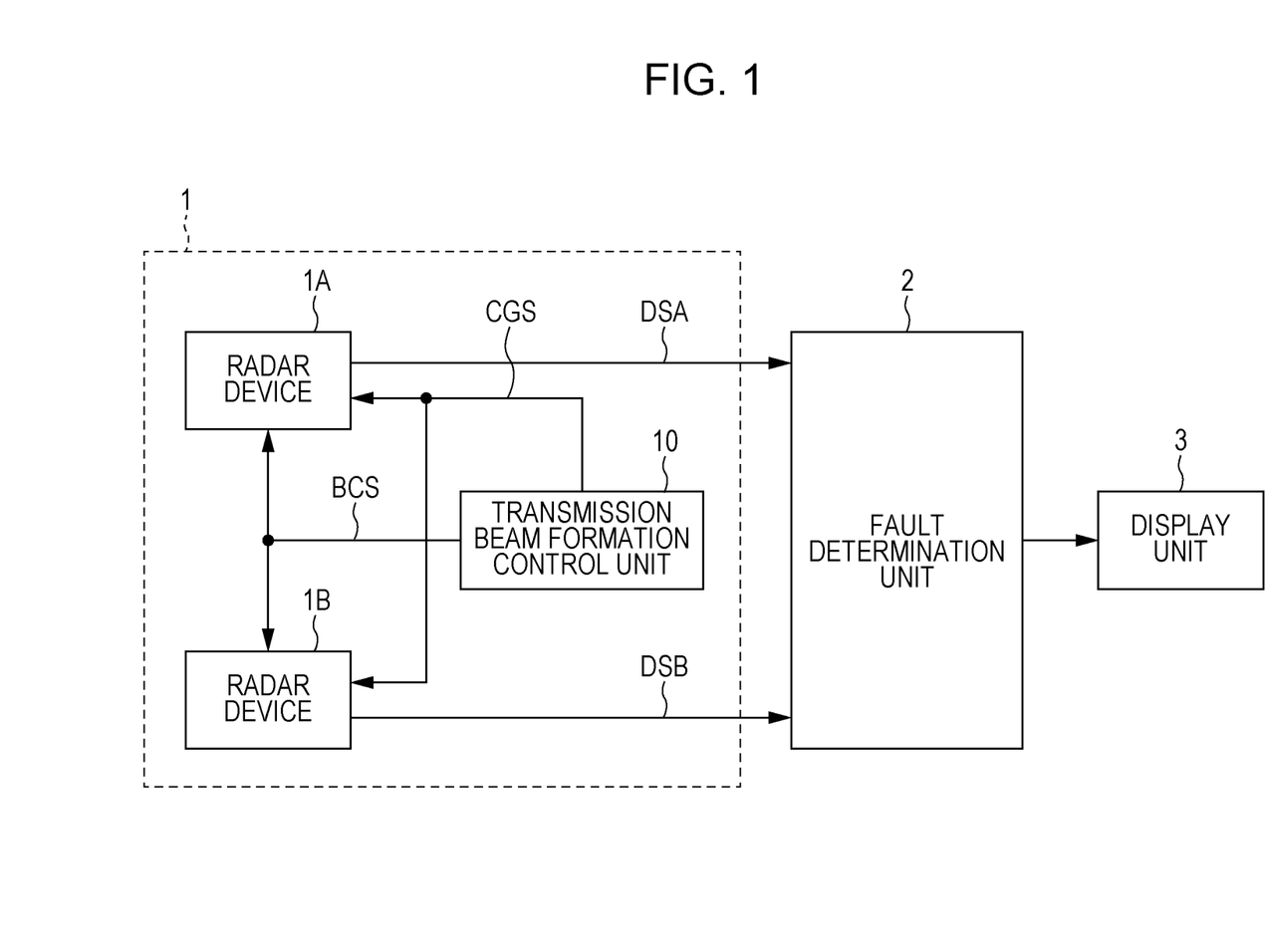
FIG. 1 is a block diagram that illustrates constituent elements of a fault determination system of a radar system according to an embodiment of the present disclosure.

FIG. 1 is a block diagram that illustrates constituent elements of a fault determination system of the radar system 1 according to the embodiment of the present disclosure. In FIG. 1, the fault determination system of the radar system 1 includes the radar system 1, a fault determination unit 2, and a display unit 3. The radar system 1 includes radar devices 1A and 1B, which are attached in both right and left end portions at the front of the vehicle, and a transmission beam formation control unit 10. Each of the radar devices 1A and 1B transmits a transmission signal of electromagnetic waves, which are obtained through frequency modulation using, for example, rectangular waves or triangular waves and are continuous waves. Each of the radar devices 1A and 1B receives a reception signal included in reflected waves input via a reception antenna 15A, which is described below. On detecting an object in accordance with the received reception signal, the radar devices 1A and 1B generate object detection signals DSA and DSB indicating that the object is present at a certain position and outputs the generated detection signals DSA and DSB to the fault determination unit 2, respectively. Each of the radar devices 1A and 1B detects the object, which is present in a direction ahead of the vehicle, by emitting a beam while performing scanning over a horizontal plane whereas the front direction of the vehicle is centrally positioned.

In the present disclosure, the "front direction" indicates a direction extending from a middle point of a line segment that connects a first transmission antenna and a second transmission antenna to a certain region in which the emission area of a beam from the first transmission antenna and the emission area of a beam from the second transmission antenna can overlap. For example, the "front direction" may be a direction that is approximately perpendicular to a virtual plane including the first transmission antenna and the second transmission antenna. In the present disclosure, examples of the "front direction of the vehicle" include a traveling direction of the vehicle and also include a direction inclined at a certain acute angle in a vertical direction with respect to the traveling direction of the vehicle. When the radar system according to the present disclosure is mounted on a vehicle, the front direction of the radar system may be different from the front direction of the vehicle. The front direction of the radar system may be the front, back, or side direction of the vehicle, or an intermediate direction between such directions.

In accordance with the object detection signal DSA or DSB input from the radar device 1A or 1B, the fault determination unit 2 detects a fault of the radar device 1B or 1A, generates fault information of the radar device 1B or 1A, and outputs the generated fault information to the display unit 3. That is, when an object is placed at a certain position, the fault determination unit 2 determines whether or not each of the radar devices 1A and 1B detects the object and determines whether or not the radar device 1A or 1B is faulty by referring to the determination results. When the fault information of the radar device 1A or 1B is input from the fault determination unit 2 to the display unit 3, the display unit 3 displays the input fault information.

Figure 2:
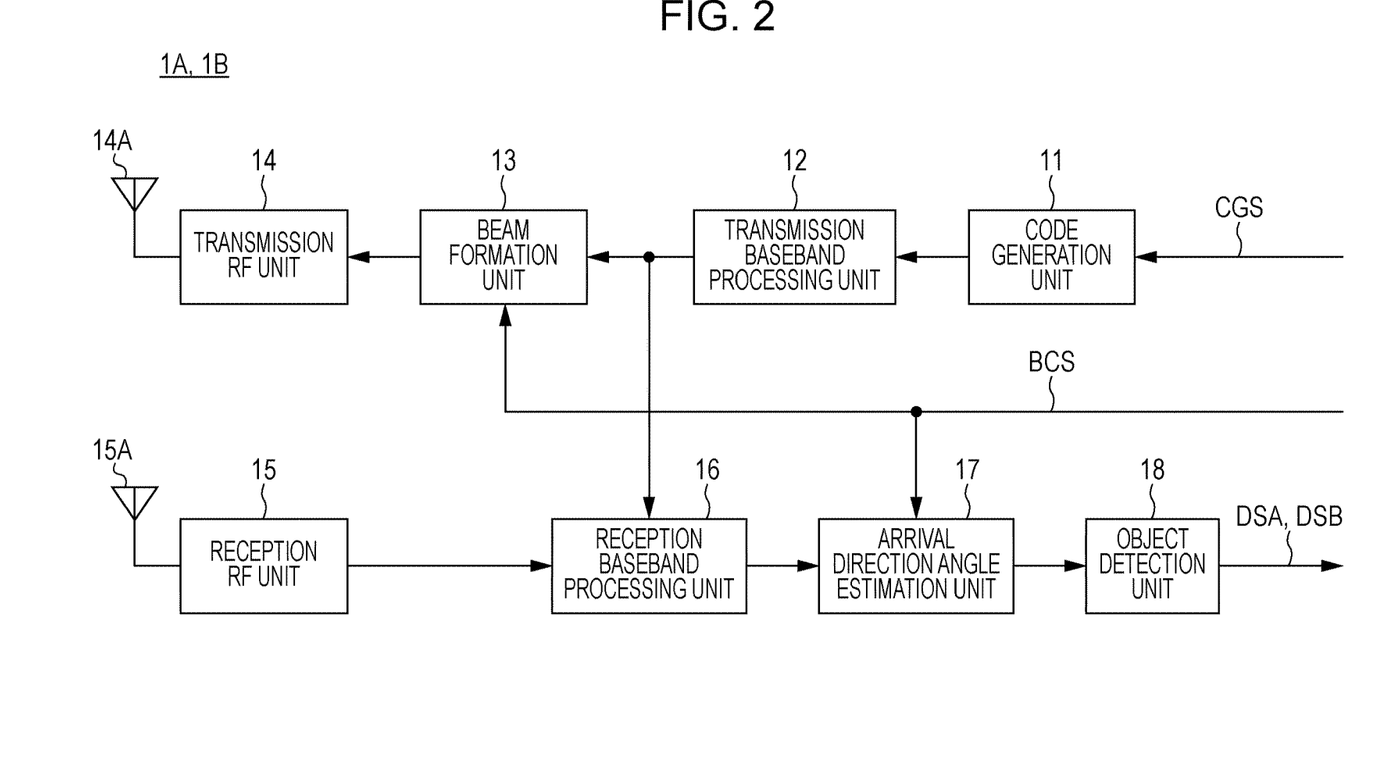
FIG. 2 is a block diagram that illustrates constituent elements of the radar device in FIG. 1.

FIG. 2 is a block diagram that illustrates constituent elements of the radar device 1A or 1B in FIG. 1. The radar device 1A in FIG. 2 includes a code generation unit 11, a transmission baseband processing unit 12, a beam formation unit 13, a transmission radio frequency (RF) unit 14, a phased array antenna 14A, which is the transmission antenna, a reception antenna 15A, a reception RF unit 15, a reception baseband processing unit 16, an arrival direction angle estimation unit 17, and an object detection unit 18. The radar device 1B also includes a code generation unit 11, a transmission baseband processing unit 12, a beam formation unit 13, a transmission RF unit 14, a phased array antenna 14A, which is the transmission antenna, a reception antenna 15A, a reception RF unit 15, a reception baseband processing unit 16, an arrival direction angle estimation unit 17, and an object detection unit 18. For more clarity in understanding the present disclosure, each constituent element of the radar device 1A may be referred to as a "first" constituent element and each constituent element of the radar device 1B may be referred to as a "second" constituent element in the description below.

The phased array antenna 14A comprises a plurality of antenna elements and a plurality of phase devices corresponding to the respective antenna elements and transmits a transmission signal for detecting an object present in a direction ahead of the vehicle while performing scanning using a beam from a front direction of the vehicle. On the basis of a fore-and-aft axle of the vehicle, an angle formed between an emission direction and the axle is herein referred to as an emission angle. The emission direction of a beam is the direction of the central axis of the beam. A beam expands whereas the central axis is centrally positioned. The area to which a beam is emitted is referred to as the emission area of the beam.

The transmission beam formation control unit 10 generates a beam control signal BCS for controlling the directivity of the phased array antenna 14A and transmits the generated beam control signal BCS to the beam formation unit 13. The transmission beam formation control unit 10 generates a code generation signal CGS for control so as to generate a modulation signal, such as a pulse amplitude modulation (PAM) signal, for performing a predetermined coding process on a baseband signal. The transmission beam formation control unit 10 transmits the generated code generation signal CGS to the code generation unit 11. The code generation unit 11 generates a modulation signal based on the code generation signal CGS and transmits the generated modulation signal to the transmission baseband processing unit 12.

The transmission baseband processing unit 12 perform the coding process on the baseband signal based on the modulation signal, and transmits the baseband signal undergone the coding process as a transmission signal. In accordance with the beam control signal BCS, the beam formation unit 13 controls the phased array antenna 14A so that the transmission signal emitted from the phased array antenna 14A is emitted in directions of predetermined emission angles. Specifically, the first beam formation unit 13 controls the first phased array antenna 14A in accordance with the beam control signal BCS so that the first transmission signal is transmitted in directions of predetermined emission angles by alternately switching a first beam to perform scanning from left to right in predetermined unit angles whereas the front direction of the vehicle is centrally positioned, and a second beam to perform scanning from right to left in the predetermined unit angles whereas the front direction of the vehicle is centrally positioned.

The second beam formation unit 13 controls the second phased array antenna 14A in accordance with the beam control signal BCS so that the phase of the first transmission signal and the phase of the second transmission signal are opposite by alternately switching a third beam to perform scanning from right to left in predetermined unit angles whereas the front direction of the vehicle is centrally positioned and a fourth beam to perform scanning from left to right in the predetermined unit angles whereas the front direction of the vehicle is centrally positioned. That is, the phase for directing the beam to transmit the first transmission signal and the phase for directing the beam to transmit the second transmission signal are opposite.

The transmission RF unit 14 up-converts the transmission signal into a high-frequency signal in a carrier frequency band and transmits the high-frequency signal to the phased array antenna 14A.

The reception antenna 15A receives the high-frequency signal reflected by the object, that is, the reflected waves. The reception RF unit 15 down-converts the high-frequency signal down into a low-frequency signal and outputs the low-frequency signal to the reception baseband processing unit 16 as a reception signal. The reception baseband processing unit 16 multiplies part of the transmission signal and the reception signal together and generates a signal of the multiplication result. Further, the reception baseband processing unit 16 performs demodulation into a baseband signal through a signal processing on the signal of the multiplication result, such as low-pass filtering. The reception baseband processing unit 16 takes temporal correlation between the baseband signal after the demodulation and the transmission signal to output the temporal correlation to the arrival direction angle estimation unit 17. The degree of the temporal correlation corresponds to, for example, a distance from the radar device 1A or 1B to the object.

In accordance with the input baseband signal and the beam control signal BCS, the arrival direction angle estimation unit 17 estimates the emission angle of the beam, which is indicated by data included in the beam control signal BCS, as the azimuth angle at which the object is present and outputs the data to the object detection unit 18. On receiving the data on the azimuth angle, each of the first object detection unit 18 and the second object detection unit 18 generates and outputs the object detection signal DSA or DSB indicating that the object is present at the azimuth angle. In other words, each of the first object detection unit 18 and the second object detection unit 18 detects the position at which the object is present in accordance with the data on the azimuth angle and the distance, and generates and outputs the object detection signal DSA or DSB including information on the position at which the object is present.

Operations of the radar fault determination system thus structured are described below.

Figure 3:
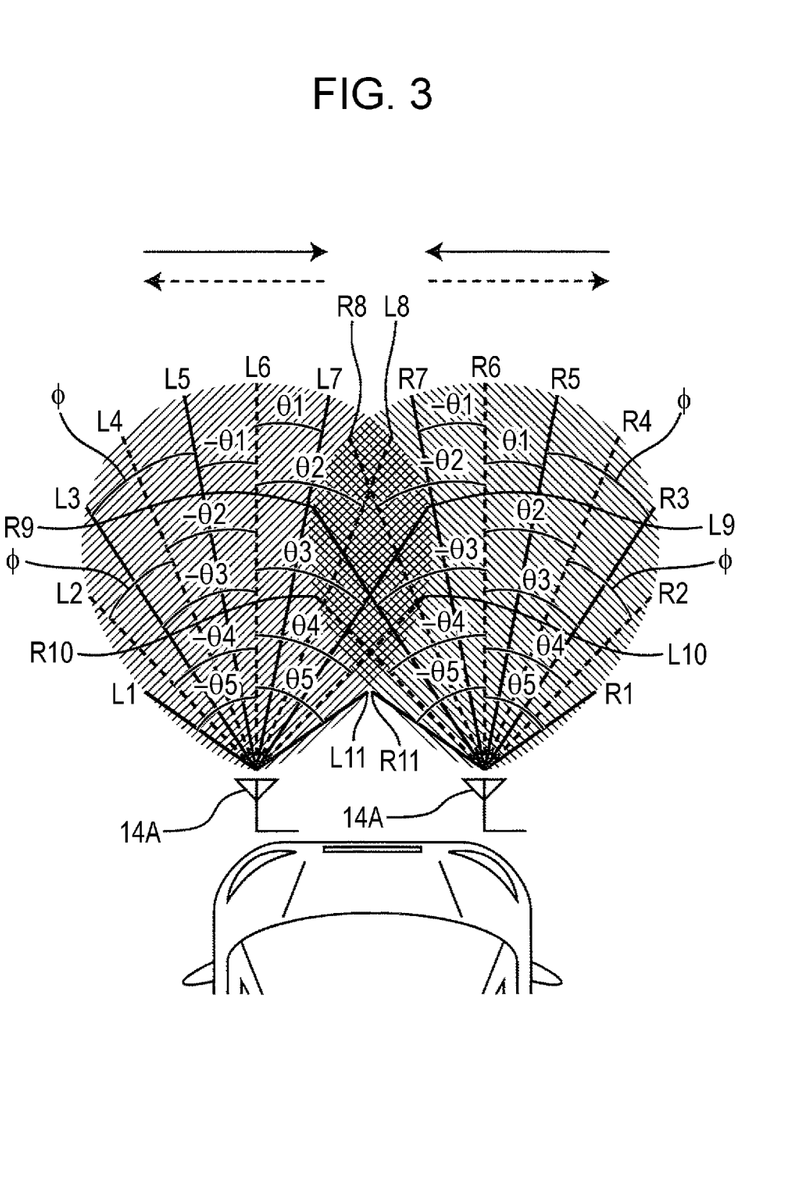
FIG. 3 is a schematic diagram for explaining operations of the radar devices in FIG. 1.

FIG. 3 is a schematic diagram for explaining operations of the radar devices 1A and 1B in FIG. 1. In FIG. 3, the radar device 1A is attached in a left front portion of a vehicle and the radar device 1B is attached in a right front portion of the vehicle. The transmission signal transmitted from the phased array antenna 14A of the radar device 1A is referred to as the first transmission signal and the transmission signal transmitted from the phased array antenna 14A of the radar device 1B is referred to as the second transmission signal.

In accordance with the beam control signal BCS, the first beam formation unit 13 controls the first phased array antenna 14A so that the first transmission signal is transmitted by alternately switching the first beam to perform scanning from left to right in a range from a predetermined first negative maximum emission angle with the emission angle of $-\theta 5$ to a predetermined first positive maximum emission angle with the emission angle of $\theta 5$ in predetermined unit angles $\varphi$ from the first negative maximum emission angle with the emission angle of $-\theta 5$ whereas the front direction of the vehicle is centrally positioned, and the second beam to perform scanning from right to left in a range from a predetermined second negative maximum emission angle with the emission angle of $-\theta 4$ to a predetermined second positive maximum emission angle with the emission angle of $\theta 4$ in the unit angles $\varphi$, where $\varphi$ represents a positive real number, from the second positive maximum emission angle with the emission angle of $\theta 4$ whereas the front direction of the vehicle is centrally positioned. The emission angle at which the beam is moved the furthest to left whereas the front direction of the vehicle is centrally positioned is referred to as the negative maximum emission angle and the emission angle at which the beam is moved the furthest to right whereas the front direction of the vehicle is centrally positioned is referred to as the positive maximum emission angle, and this applies to the description below as well.

Specifically, the first beam formation unit 13 controls the first phased array antenna 14A so that the beam moves in the following order: a direction L1 with the emission angle of $-\theta 5$, a direction L10 with the emission angle of $\theta 4$, a direction L3 with the emission angle of $-\theta 3$, a direction L8 with the emission angle of $\theta 2$, a direction L5 with the emission angle of $-\theta 1$, a direction L6 with the emission angle of 0, a direction L7 with the emission angle of $\theta 1$, a direction L4 with the emission angle of $-\theta 2$, a direction L9 with the emission angle of $\theta 3$, a direction L2 with the emission angle of $-\theta 4$, and a direction L11 with the emission angle of $\theta 5$. Each of $\theta 1$, $\theta 2$, $\theta 3$, $\theta 4$, and $\theta 5$ represents a positive real number. For example, the first beam formation unit 13 controls the first phased array antenna 14A in accordance with the beam control signal BCS so that the first transmission signal is transmitted by alternately switching the first beam to perform scanning from left to right in a range from the emission angle of $-75$ degrees to the emission angle of 75 degrees in units of 15 degrees from the emission angle of $-75$ degrees whereas the front direction of the vehicle is centrally positioned, and the second beam to perform scanning from right to left in a range from the emission angle of $-60$ degrees to the emission angle of 60 degrees in units of 15 degrees from the emission angle of 60 degrees whereas the front direction of the vehicle is centrally positioned. Note that a beam moving in the order of the directions from L1, L3, L5, L7, L9 to L11 is an example of a first beam of the present disclosure, and a beam moving in the order of the directions from L10, L8, L6, L4 to L2 is an example of a second beam of the present disclosure.

In accordance with the beam control signal BCS, the second beam formation unit 13 controls the second phased array antenna 14A so as to transmit the second transmission signal so that the phase of the first transmission signal and the phase of the second transmission signal are opposite. That is, the second beam formation unit 13 controls the second phased array antenna 14A in accordance with the beam control signal BCS so that the second transmission signal is transmitted by alternately switching the third beam to perform scanning from right to left in a range from a predetermined first negative maximum emission angle with the emission angle of $-\theta 5$ to a predetermined first positive maximum emission angle with the emission angle of $\theta 5$ in the unit angles $\varphi$ from the first positive maximum emission angle with the emission angle of $\theta 5$ whereas the front direction of the vehicle is centrally positioned, and the fourth beam to perform scanning from left to right in a range from a predetermined second negative maximum emission angle with the emission angle of $-\theta 4$ to a predetermined second positive maximum emission angle with the emission angle of $\theta 4$ in the unit angles $\varphi$ from the second negative maximum emission angle with the emission angle of $-\theta 4$ whereas the front direction of the vehicle is centrally positioned.

Specifically, the second beam formation unit 13 controls the second phased array antenna 14A so that the beam moves in the following order: a direction R1 with the emission angle of $\theta 5$, a direction R10 with the emission angle of $-\theta 4$, a direction R3 with the emission angle of θ3, a direction R8 with the emission angle of −θ2, a direction R5 with the emission angle of θ1, a direction R6 with the emission angle of 0, a direction R7 with the emission angle of −θ1, a direction R4 with the emission angle of θ2, a direction R9 with the emission angle of −θ3, a direction R2 with the emission angle of θ4, and a direction R11 with the emission angle of −θ5. For example, the second beam formation unit 13 controls the second phased array antenna 14A in accordance with the beam control signal BCS so that the second transmission signal is transmitted by alternately switching the third beam to perform scanning from right to left in a range from the emission angle of −75 degrees to the emission angle of 75 degrees in units of 15 degrees from the emission angle of 75 degrees whereas the front direction of the vehicle is centrally positioned, and the fourth beam to perform scanning from left to right in a range from the emission angle of −60 degrees to the emission angle of 60 degrees in units of 15 degrees from the emission angle of −60 degrees whereas the front direction of the vehicle is centrally positioned. Note that a beam moving in the order of the directions from R1, R3, R5, R7, R9 to R11 is an example of a third beam of the present disclosure, and a beam moving in the order of the directions from R10, R8, R6, R4 to R2 is an example of a fourth beam of the present disclosure.

Figure 4:
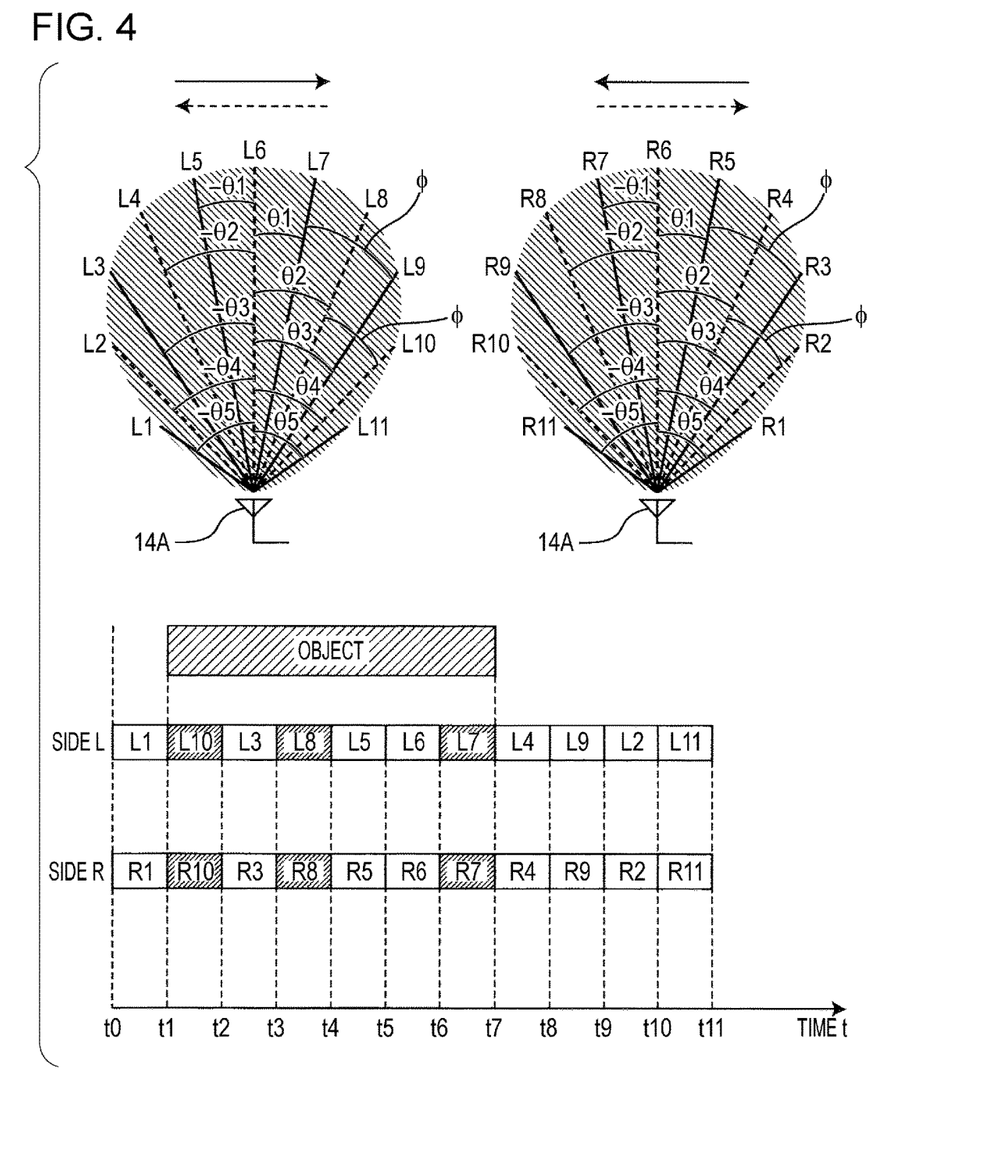
FIG. 4 is a schematic diagram for explaining operations of the fault determination unit in FIG. 1.

FIG. 4 is a schematic diagram for explaining operations of the fault determination unit 2 in FIG. 1. With reference to FIG. 4, the operations of the fault determination unit 2 performed when an object is placed ahead of the vehicle from time t1 to time t7 are described.

In FIG. 4, the directions L1 and R1 are used in the scanning from time t0 to time t1, the directions L10 and R10 are used in the scanning from time t1 to time t2, and the directions L3 and R3 are used in the scanning from time t2 to time t3. The rest is similar. In the period from time t1 to time t7, the beam from the radar device 1A and the beam from the radar device 1B overlap at three timings, which are from time t1 to time t2, from time t3 to time t4, and from time t6 to time t7. That is, the emission areas of the directions L10 and R10 overlap from time t1 to time t2, the emission areas of the directions L8 and R8 overlap from time t3 to time t4, and the emission areas of the directions L7 and R7 overlap from time t6 to time t7. In other words, in the period from time t0 to time t5, combinations of the emission angles at which the emission areas of the beams do not overlap each other, which are the combination of −θ5 on side L and θ5 on side R, the combination of −θ3 on side L and θ3 on side R, and the combination of −θ1 on side L and θ1 on side R, and combinations of the emission angles at which the emission areas of the beams overlap each other, which are the combination of θ4 on side L and −θ4 on side R and the combination of θ2 on side L and −θ82 on side R, are alternately switched.

In the two radar devices 1A and 1B, codes having correlation may be used. According to this structure, when an object is detected in an area in which two beams overlap, the two beams are reflected by the identical object in in-phase synthesis and it is thus possible to enhance the intensity of the reflection and increase the sensitivity for detecting the object. In the example of FIG. 4, the radar devices 1A and 1B according to the present embodiment can detect the object present in the area in which the two beams overlap at three timings using the first phased array antenna 14A and the second phased array antenna 14A. In contrast, when as in a conventional manner, the beam of one antenna is used to perform scanning simply in sequence from left to right so that for example, the beam on side L moves in the order of the directions L1, L2, L3, L4, L5, L6, L7, . . . , and the beam of the other antenna is used to perform scanning simply in sequence from right to left so that for example, the beam on side R moves in the order of the directions R1, R2, R3, R4, R5, R6, R7, . . . , an object present in the area in which the two beams overlap is detected using two antennas at one timing, which is because of, for example, the direction L7 on side L and the direction R7 on side R. Thus, the radar devices 1A and 1B according to the present embodiment can shorten each of the timings during which an object present in an area in which a plurality of beams overlap cannot be detected using a plurality of antennas, compared to conventional techniques. Therefore, the object can be detected with high accuracy accordingly, compared to conventional techniques.

In accordance with the object detection signal DSA from the radar device 1A or the object detection signal DSB from the radar device 1B, the fault determination unit 2 detects a fault of the radar device 1A or 1B. That is, when an object is present at a certain position in the area where the two beams overlap, in accordance with the object detection signal DSA, the fault determination unit 2 recognizes that the object is present at the azimuth angles θ4, θ2, and θ1 on the side of the radar device 1A. Further, in accordance with the object detection signal DSB, the fault determination unit 2 recognizes that the object is present at the azimuth angles −θ4, −θ2, and −θ1 on the side of the radar device 1B. When the radar devices 1A and 1B detect the object at the certain position, it is determined that neither the radar device 1A nor the radar device 1B is faulty. In contrast, when only one of the radar devices 1A and 1B detects the object at the certain position, it is determined that the radar device 1A or the radar device 1B is faulty. When, in accordance with the object detection signal DSA, the fault determination unit 2 recognizes that the object is present at the azimuth angles θ4, θ2, and θ1 of the radar device 1A and does not recognize that the object is present at the certain position through the radar device 1B, the fault determination unit 2 determines that the radar device 1B is faulty. When, in accordance with the object detection signal DSB, the fault determination unit 2 recognizes that the object is present at the azimuth angles −θ4, −θ2, and −θ1 of the radar device 1B and does not recognize that the object is present at the certain position through the radar device 1A, the fault determination unit 2 determines that the radar device 1A is faulty.

The radar device according to the above-described embodiment can shorten each of the timings during which an object present in a direction ahead of the vehicle cannot be detected using a plurality of antennas, compared to conventional techniques. Thus, the object can be detected with high accuracy, compared to conventional techniques. In addition, since the plurality of antennas in the right front portion and the left front portion of the vehicle can shorten the length of timings during which no object can be detected at the same time, a fault can be determined with higher accuracy.

In the two radar devices 1A and 1B, codes having mutual correlation may be used. According to this structure, when an object is detected in an area in which two beams overlap, the two beams are reflected by the identical object in in-phase synthesis and thus, the intensity of the reflection is enhanced. Also in this case, operations and advantages similar to those in the present embodiment can be achieved. In addition, compared to the above-described embodiment, the sensitivity for detecting the object in the area in which the two beams overlap is increased.

Further, in the two radar devices 1A and 1B, codes having no mutual correlation may be used to perform the coding process. When a signal that has undergone the coding process using the code having no correlation with itself is received, an object may be detected in accordance with the signal by finding that the signal has undergone the coding process using the code having no correlation with itself. Also in this case, operations and advantages similar to those in the present embodiment can be achieved. In addition, compared to the above-described embodiment, the object can be detected even outside the area in which the two beams overlap.

[Variation 1]

Figure 5:
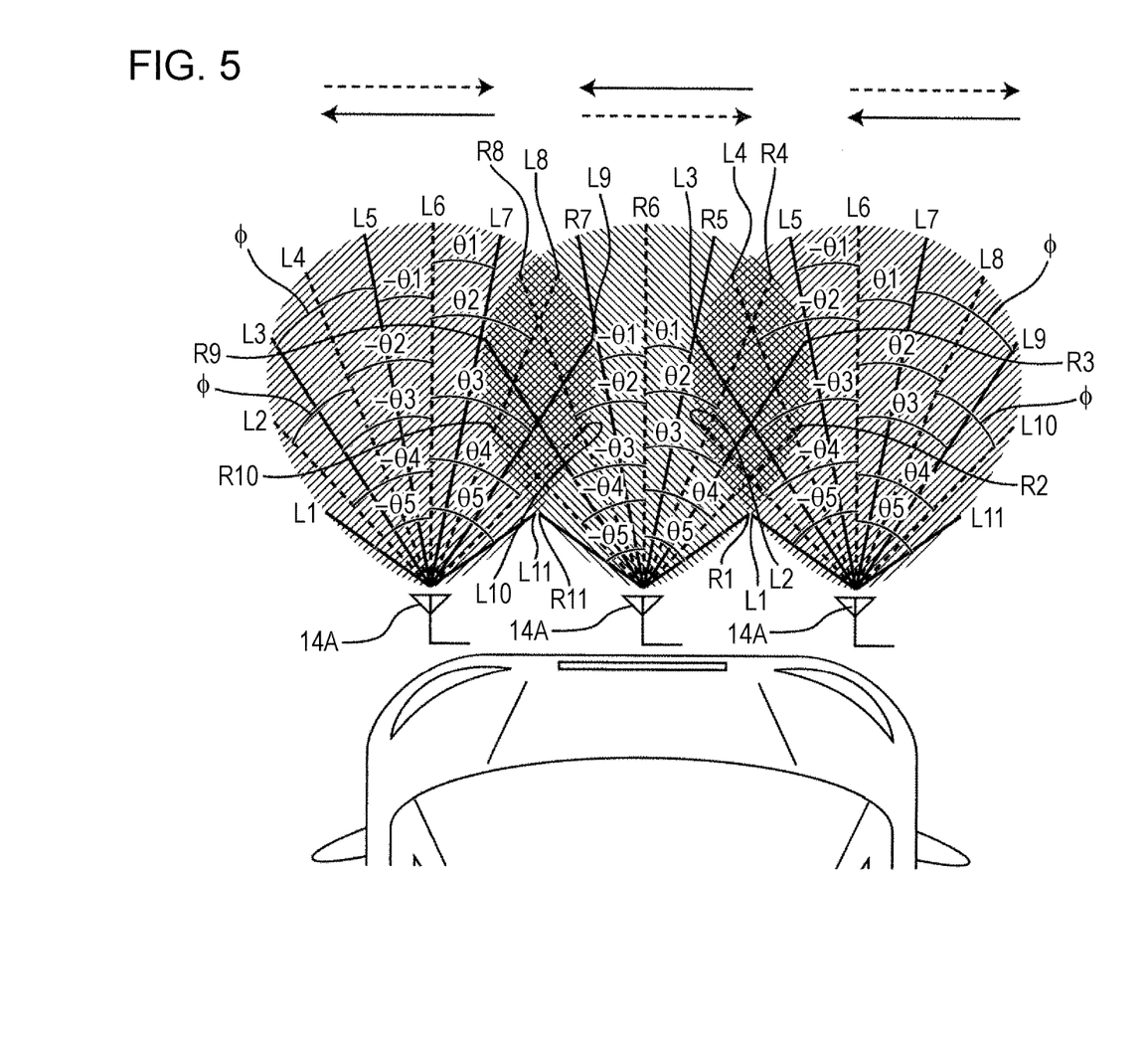
FIG. 5 is a schematic diagram for explaining operations of radar devices according to a variation of the embodiment of the present disclosure.

FIG. 5 is a schematic diagram for explaining operations of radar devices 1A and 1B according to variation 1 of the embodiment of the present disclosure. When compared to the radar devices 1A and 1B in FIG. 3, the radar devices 1A and 1B in FIG. 5 are different in that the radar devices 1A and 1B are attached in a left end portion and a central portion at the front of a vehicle, respectively, and the radar device 1A is further attached in a right end portion at the front of the vehicle instead of the radar devices 1A and 1B attached in both the right and left end portions at the front of the vehicle. The radar devices 1A and 1B according to variation 1 of the embodiment of the present disclosure can perform operations and provide effects and advantage, which are similar to those of the radar devices 1A and 1B according to the above-described embodiment.

[Variation 2]

In the above-described embodiment and variation 1, the radar fault determination system includes the radar system 1. The radar system 1 may include the fault determination unit 2, and the radar system 1 may determine a fault of its own. In the embodiment and variation 1 described above, the radar system 1 is mounted on a vehicle and the radar devices 1A and 1B each scan a region in front of the vehicle by changing the emission angle of a beam whereas the front direction of the vehicle is centrally positioned. The radar system 1 may be arranged in another place instead of being mounted on a vehicle. For example, the radar system 1 may be arranged at an intersection and each of the radar devices 1A and 1B may scan a predetermined region of the intersection.

The radar system 1 may further include a storage device, such as semiconductor memory, which stores data indicating the order of switching the combinations of the emission angles of the beams from the radar devices 1A and 1B. The order may be set on the basis of random numbers. Note that, in this disclosure, "random" includes random and pseudo-random. Also, the order may be set so that the probability of causing a combination of the emission angles at which the emission areas of the beams from the radar devices 1A and 1B overlap indicates a given value. That is, the order may be set so that the ratio between the combinations of the emission angles at which the emission areas of the beams from the radar devices 1A and 1B overlap each other and the combinations of the emission angles at which the emission areas of the beams from the radar devices 1A and 1B do not overlap each other indicates a predetermined value. The value of the ratio equals, for example, the value of the ratio between the region in which the emission areas of the beams from the radar devices 1A and 1B overlap each other, such as the region in which the oblique lines that indicate the emittable area of the beam from one of the phased array antennas 14A in FIG. 3 overlap the oblique lines that indicate the emittable area of the beam from the other of the phased array antennas 14A, and the region in which the emission areas of the beams from the radar devices 1A and 1B do not overlap each other. Further, the order may be set so that the combinations of the emission angles at which the emission areas overlap each other and the combinations of the emission angles at which the emission areas do not overlap each other are alternately caused.

The transmission beam formation control unit 10 generates the beam control signal BCS in the order indicated by the data stored in the storage device, and outputs the generated beam control signal BCS to the radar devices 1A and 1B. In accordance with the beam control signal BCS, the beam formation unit 13 of each of the radar devices 1A and 1B switches the emission angles of the beams in the above-described order. For example, the beam on side L may be switched in the order of the directions from L1, L8, L2, L11, L5, L10, L6, L9, L4, L7, to L3, and the beam on side R may be switched in the order of the directions from R1, R8, R2, R11, R5, R10, R6, R9, R4, R7, to R3. When the scanning is performed in the order based on the random numbers as described above, similar to the above-described embodiment, each of the lengths of timings during which no object can be detected at the same time using a plurality of antennas lasts can be shortened.

The radar system 1 may further include a random number generator, which generates a random number. In this case, on the basis of the random number generated by the random number generator, the transmission beam formation control unit 10 may decide the order of switching the combinations of the emission angles of the beams from the radar devices 1A and 1B, and may cause the data indicating the decided order to be stored in the storage device. As another example, when the combinations of the emission angles of the beams are switched, the random number generator may generate a random number every time. In this case, on the basis of the generated random number, the transmission beam formation control unit 10 may decide the next combination of the emission angles and may output the beam control signal BCS indicating the combination.

Further, in the embodiment or variation 1, the first beam may be replaced with a fifth beam used in scanning from left to a central portion in predetermined unit angles, such as a beam switched in the order of the directions from L1, L2, L3, L4, L5, to L6, the second beam may be replaced with a sixth beam used in scanning from the central portion to right in the predetermined unit angles, such as a beam switched in the order of the directions from L6, L7, L8, L9, L10, to L11, the third beam may be replaced with a seventh beam used in scanning from right to the central portion in the predetermined unit angles, such as a beam switched in the order of the directions from R1, R2, R3, R4, R5, to R6, and the fourth beam may be replaced with an eighth beam used in scanning from the central portion to left in the predetermined unit angles, such as a beam switched in the order of the directions from R6, R7, R8, R9, R10, to R11.

As another example, in the embodiment or variation 1, the first beam may be replaced with a ninth beam used in scanning from right to the central portion in predetermined unit angles, the second beam may be replaced with a tenth beam used in scanning from the central portion to left in the predetermined unit angles, the third beam may be replaced with an eleventh beam used in scanning from left to the central portion in the predetermined unit angles, and the fourth beam may be replaced with a twelfth beam used in scanning from the central portion to right in the predetermined unit angles. Also in this manner, the combinations of the emission angles at which the emission areas of the beams from the first phased array antenna 14A and the second phased array antenna 14A overlap each other, and the combinations of the emission angles at which the emission areas of the beams from the first phased array antenna 14A and the second phased array antenna 14A do not overlap each other may be alternately switched.

[Variation 3]

In the embodiment, variation 1, and variation 2, the scanning is performed by directing the beams so that the beam from the phased array antenna 14A of the first radar device 1A and the beam from the phased array antenna 14A of the second radar device 1B have opposite phases. The scanning may be performed using the beams with non-opposite phases. For example, the phases may be shifted like the combination of the direction L1 on side L and the direction R2 on side R. The shift may be ununiform and for example, the combination of the direction L1 on side L and the direction R2 on side R may be switched to the combination of the direction L8 on side L and the direction R1 on side R.

[Variation 4]

For example, a period from the emission of the beam on side L at a predetermined emission angle (e.g. the direction L1) to the subsequent emission of the beam on side L at the emission angle identical to the predetermined emission angle (e.g. the direction L1) is regarded as one cycle. In this case, the emission area of the beam on side L and the emission area of the beam on side R may overlap for a plurality of timings in one cycle, such as three or more timings. Here, the number of timings corresponds to the number of timings at which the emission area of the beam on side L and the emission area of the beam on side R overlap in succession in terms of time. For example, when the beams move in the order from the combination of the directions L1 and R1, the combination of the directions L9 and R9, the combination of the directions L8 and R8, to the combination of the directions L1 and R1, the timing at which the emission area of the beam on side L overlaps the emission area of the beam on side R is just once (i.e. the timing for the combination of the directions L9 and R9 and the combination of the directions L8 and R8). Two or more selected from the above-described Embodiment and Variations 1-4 may be combined each other.

In the present disclosure, all or part of the functional blocks illustrated in FIGS. 1 and 2 may be implemented by one or more electronic circuits including a semiconductor device, a semiconductor integrated circuit (IC), or large scale integration (LSI). The LSI or IC may be integrated into a single chip or may be configured by combining a plurality of chips. For example, the functional blocks other than a storage element may be integrated into a single chip. The LSI or IC mentioned above may be referred to in another way, depending on the degree of the integration, and may be referred to as system LSI, very large scale integration (VLSI), or ultra large scale integration (ULSI). A field programmable gate array (FPGA), which is programmed after manufacturing the LSI, or a reconfigurable logic device, which is capable of reconstruction related to the junction inside the LSI or the setup of circuit blocks inside the LSI may also be used for the same purpose.

In addition, all or part of the functions or processes of the functional blocks illustrated in FIGS. 1 and 2 can be implemented using software. In this case, the software is recorded in one or more non-transitory recording media, such as read-only memory (ROM), an optical disk, or a hard disk drive, and when the software is executed by a processor, the software causes the processor and a peripheral device to perform specific functions in the software. A system or device may include one or more non-transitory recording media in which the software is recorded, a processor, and a hardware device needed, such as an interface.

A radar system according to a first aspect includes: a first radar device and a second radar device that each detect an object ahead of a vehicle by performing scanning using a beam whereas a front direction of the vehicle is centrally positioned, and a transmission beam formation control unit that generates a beam control signal to control directivity of the first transmission antenna and directivity of the second transmission antenna. The first radar device includes: a first transmission antenna that transmits a first transmission signal to detect the object ahead of the vehicle while performing scanning by changing an emission angle of a beam from a front direction of the vehicle; and a first beam formation unit that controls the first transmission antenna in accordance with the beam control signal so that the first transmission signal is transmitted in a direction at a predetermined emission angle by alternately switching a first beam to perform scanning from left to right whereas the front direction of the vehicle is centrally positioned, and a second beam to perform scanning from right to left whereas the front direction of the vehicle is centrally positioned. The second radar device includes: a second transmission antenna that transmits a second transmission signal to detect the object ahead of the vehicle while performing scanning by changing the emission angle of the beam from the front direction of the vehicle; and a second beam formation unit that controls the second transmission antenna in accordance with the beam control signal so that the phase of the first transmission signal and the phase of the second transmission signal are opposite.

The radar system according to the first aspect can increase the timings at which an object present in a direction ahead of the vehicle is detected, compared to conventional techniques, and accordingly, the object can be detected with high accuracy, compared to conventional techniques. In addition, the possibility of detecting objects present on the right and left sides ahead of a vehicle at the same time can be increased and thus, a fault can be determined with higher accuracy.

A radar system according to a second aspect is the radar system according to the first aspect, in which the second beam formation unit controls the second transmission antenna in accordance with the beam control signal so that the phase of the first transmission signal and the phase of the second transmission signal are opposite by alternately switching a third beam to perform scanning from right to left whereas the front direction of the vehicle is centrally positioned, and a fourth beam to perform scanning from left to right whereas the front direction of the vehicle is centrally positioned.

The radar system according to the second aspect can increase the timings at which an object present in a direction ahead of the vehicle is detected, compared to conventional techniques, and accordingly, the object can be detected with high accuracy, compared to conventional techniques.

A radar system according to a third aspect is the radar system according to the second aspect, in which the first beam formation unit controls the first transmission antenna so that the first beam is used to perform the scanning from left to right in a range from a predetermined first negative maximum emission angle to a predetermined first positive maximum emission angle in predetermined unit angles from the first negative maximum emission angle whereas the front direction of the vehicle is centrally positioned, and the second beam is used to perform the scanning from right to left in a range from a predetermined second negative maximum emission angle to a predetermined second positive maximum emission angle in the unit angles from the second positive maximum emission angle whereas the front direction of the vehicle is centrally positioned. The second beam formation unit controls the second transmission antenna so that the third beam is used to perform the scanning from right to left in the range from the first negative maximum emission angle to the first positive maximum emission angle in the unit angles from the first positive maximum emission angle whereas the front direction of the vehicle is centrally positioned, and the fourth beam is used to perform the scanning from left to right in the range from the second negative maximum emission angle to the second positive maximum emission angle in the unit angles from the second negative maximum emission angle whereas the front direction of the vehicle is centrally positioned.

The radar system according to the third aspect can increase the timings at which an object present in a direction ahead of the vehicle is detected, compared to conventional techniques, and accordingly, the object can be detected with high accuracy, compared to conventional techniques.

A radar system according to a fourth aspect is the radar system according to any one of the first to third aspects, in which the first radar device further includes: a first reception antenna that receives reflected waves obtained when the first transmission signal is reflected by the object as a first reception signal; a first reception baseband processing unit that performs multiplication on the first reception signal and the first transmission signal to generate a first resultant signal of the multiplication and, in accordance with the generated first resultant signal of the multiplication, performs demodulation into a first baseband signal; and a first arrival direction angle estimation unit that, in accordance with the first baseband signal and the beam control signal, estimates data on an emission angle of a beam as a first azimuth angle at which the object is present. The second radar device further includes: a second reception antenna that receives reflected waves obtained when the second transmission signal is reflected by the object as a second reception signal; a second reception baseband processing unit that performs multiplication on the second reception signal and the second transmission signal to generate a second resultant signal of the multiplication and, in accordance with the generated second resultant signal of the multiplication, performs demodulation into a second baseband signal; and a second arrival direction angle estimation unit that, in accordance with the second baseband signal and the beam control signal, estimates data on an emission angle of a beam as a second azimuth angle at which the object is present.

The radar system according to the fourth aspect can increase the timings at which an object present in a direction ahead of the vehicle is detected, compared to conventional techniques, and accordingly, the object can be detected with high accuracy, compared to conventional techniques.

A fault determination system according to a fifth aspect is a fault determination system that determines a fault of the radar system according to the fourth aspect, the fault determination system including: a fault determination unit that, in accordance with the data on the first azimuth angle and the data on the second azimuth angle, determines that the radar system is faulty when a position of the object is not detected.

The fault determination system according to the fifth aspect enables a fault of the radar system to be detected with high accuracy.

A radar system according to a sixth aspect includes: control circuitry that generates a beam control signal; a first radar device including (i) a first transmission antenna that transmits a first transmission signal by using a first beam and a second beam to detect an object, and (ii) first beam formation circuitry that, in accordance with the beam control signal, causes the first transmission antenna to perform a first scan including a second scan from left to right by changing an emission angle of the first beam, whereas a predetermined front direction is centrally positioned, and a third scan from right to left by changing an emission angle of the second beam, whereas the front direction is centrally positioned, in such a manner that a part of the second scan and a part of the third scan are performed alternately one after another; and a second radar device including (iii) a second transmission antenna that transmits a second transmission signal to detect the object, and (iv) second beam formation circuitry that, in accordance with the beam control signal, cause the second transmission antenna to perform a fourth scan in such a manner that a phase of the fourth scan is opposite to a phase of the first scan.

A radar system according to a seventh aspect is the radar system according to the sixth aspect, in which the second transmission antenna transmits a second transmission signal by using a third beam and a fourth beam. The fourth scan includes a fifth scan from right to left by changing an emission angle of the third beam, whereas the front direction is centrally positioned, and a sixth scan from left to right by changing an emission angle of the fourth beam, whereas the front direction is centrally positioned, in such a manner that a part of the fourth scan and a part of the fifth scan are performed alternately one after another.

A radar system according to an eighth aspect is the radar system according to the seventh aspect, in which the first beam formation circuitry causes the first transmission antenna to perform the second scan in a range from a predetermined first negative maximum emission angle to a predetermined first positive maximum emission angle in predetermined unit angles from the first negative maximum emission angle, and to perform the third scan in a range from a predetermined second negative maximum emission angle to a predetermined second positive maximum emission angle in the unit angles from the second positive maximum emission angle. The second beam formation circuitry causes the second transmission antenna to perform the fifth scan in the range from the first negative maximum emission angle to the first positive maximum emission angle in the unit angles from the first positive maximum emission angle, and to perform the sixth scan in the range from the second negative maximum emission angle to the second positive maximum emission angle in the unit angles from the second negative maximum emission angle.

A radar system according to a ninth aspect is the radar system according to any one of the sixth to eighth aspects, in which the radar system is mounted on a vehicle and the front direction is a front direction of the vehicle.

A radar system according to a tenth aspect is the radar system according to any one of the sixth to ninth aspects, in which the first radar device further includes: a first reception antenna that receives reflected waves obtained when the first transmission signal is reflected by the object as a first reception signal; first reception circuitry that performs multiplication on the first reception signal and the first transmission signal to generate a first resultant signal of the multiplication and, in accordance with the generated first resultant signal of the multiplication, demodulates the first reception signal into a first baseband signal; and first estimation circuitry that, in accordance with the first baseband signal and the beam control signal, estimates an emission angle of a beam as a first azimuth angle at which the object is present. The second radar device further includes: a second reception antenna that receives reflected waves obtained when the second transmission signal is reflected by the object as a second reception signal; second reception circuitry that performs multiplication on the second reception signal and the second transmission signal to generate a second resultant signal of the multiplication and, in accordance with the generated second resultant signal of the multiplication, demodulates the second reception signal into a second baseband signal; and second estimation circuitry that, in accordance with the second baseband signal and the beam control signal, estimates an emission angle of a beam as a second azimuth angle at which the object is present.

A radar system according to an eleventh aspect is the radar system according to any one of sixth to tenth aspects, in which the first radar device further includes a first reception antenna that receives reflected waves obtained when the first transmission signal is reflected by the object as a first reception signal, and detects a position of the object in accordance with the first reception signal and the first transmission signal. The second radar device further includes a second reception antenna that receives reflected waves obtained when the second transmission signal is reflected by the object as a second reception signal, and detects the position of the object in accordance with the second reception signal and the second transmission signal.

A radar system according to a twelfth aspect is the radar system according to the eleventh aspect, further including: a fault determination circuitry that, in a case where emission areas of the beams of the first transmission antenna and the second transmission antenna overlap each other, in accordance with a detection result of the first radar device and a detection result of the second radar device, determines that the radar system is faulty when one of the first radar device and the second radar device detects the object in a region in which the emission areas overlap and the other of the first radar device and the second radar device does not detect the object in the region.

A radar system according to a thirteenth aspect includes: a first transmission antenna that emits a beam carrying a first transmission signal to detect an object; a second transmission antenna that emits a beam carrying a second transmission signal to detect the object; control circuitry that generates a beam control signal to perform scanning by switching emission directions of the beams emitted from the first transmission antenna and the second transmission antenna so that the beams emitted from the first transmission antenna and the second transmission antenna overlap each other at random timings; first beam formation circuitry that forms the beam emitted from the first transmission antenna in accordance with the beam control signal; and second beam formation circuitry that forms the beam emitted from the second transmission antenna in accordance with the beam control signal.

A radar system according to a fourteenth aspect includes: a first transmission antenna that emits a beam carrying a first transmission signal to detect an object; a second transmission antenna that emits a beam carrying a second transmission signal to detect the object; control circuitry that generates a beam control signal to perform scanning by switching emission directions of the beams from the first transmission antenna and the second transmission antenna so that the beams from the first transmission antenna and the second transmission antenna overlap each other at a plurality of timings in a period between emission of the beam emitted from the first transmission antenna in a predetermined emission direction and subsequent emission of the beam emitted from the first transmission antenna in the predetermined emission direction; first beam formation circuitry that forms the beam emitted from the first transmission antenna in accordance with the beam control signal; and second beam formation circuitry that forms the beam emitted from the second transmission antenna in accordance with the beam control signal.

A radar system according to a fifteenth aspect is the radar system according to the fourteenth aspect, in which the beam control signal causes a combination of the emission directions in which the beams of the first transmission antenna and the second transmission antenna overlap each other and a combination of the emission directions in which the beams of the first transmission antenna and the second transmission antenna do not overlap each other to be alternately switched.

As described above in detail, the radar device according to the present disclosure enables detection of an object.

What is claimed is:
1. A radar system comprising:
control circuitry that generates a beam control signal;
a first radar device including:
 (i) a first transmission antenna that transmits a first transmission signal by using a first beam and a second beam to detect an object, and
 (ii) first beam formation circuitry that, in accordance with the beam control signal, causes the first transmission antenna to perform a first-phase scan constituted by a first scan and a second scan, the first scan being from left to right by changing an emission angle of the first beam, whereas a predetermined front direction is centrally positioned, and the second scan being from right to left by changing an emission angle of the second beam, whereas the front direction is centrally positioned, in such a manner that a part of the first scan and a part of the second scan are performed alternately one after another; and
a second radar device including:
 (iii) a second transmission antenna that transmits a second transmission signal to detect the object, and
 (iv) second beam formation circuitry that, in accordance with the beam control signal, cause the second transmission antenna to perform a second-phase scan,
wherein a phase of the second-phase scan is opposite to a phase of the first-phase scan.
2. The radar system according to claim 1, wherein:
the second transmission antenna transmits a second transmission signal by using a third beam and a fourth beam, and
the second-phase scan is constituted by a third scan from right to left by changing an emission angle of the third beam, whereas the front direction is centrally positioned, and a fourth scan from left to right by changing an emission angle of the fourth beam, whereas the front direction is centrally positioned, in such a manner that a part of the third scan and a part of the fourth scan are performed alternately one after another.
3. The radar system according to claim 2, wherein:
the first beam formation circuitry causes the first transmission antenna to perform the first scan in a range from a predetermined first negative maximum emission angle to a predetermined first positive maximum emission angle in predetermined unit angles from the first negative maximum emission angle, and to perform the second scan in a range from a predetermined second negative maximum emission angle to a predetermined second positive maximum emission angle in the unit angles from the second positive maximum emission angle, and the second beam formation circuitry causes the second transmission antenna to perform the third scan in the range from the first negative maximum emission angle to the first positive maximum emission angle in the unit angles from the first positive maximum emission angle, and to perform the fourth scan in the range from the second negative maximum emission angle to the second positive maximum emission angle in the unit angles from the second negative maximum emission angle.

4. The radar system according to claim 1, wherein the radar system is mounted on a vehicle and the front direction is a front direction of the vehicle.

5. The radar system according to claim 1, wherein:
the first radar device further includes:
   a first reception antenna that receives reflected waves obtained when the first transmission signal is reflected by the object as a first reception signal;
   first reception circuitry that performs multiplication on the first reception signal and the first transmission signal to generate a first resultant signal of the multiplication and, in accordance with the generated first resultant signal of the multiplication, demodulates the first reception signal into a first baseband signal; and
   first estimation circuitry that, in accordance with the first baseband signal and the beam control signal, estimates an emission angle of a beam as a first azimuth angle at which the object is present, and
the second radar device further includes:
   a second reception antenna that receives reflected waves obtained when the second transmission signal is reflected by the object as a second reception signal;
   second reception circuitry that performs multiplication on the second reception signal and the second transmission signal to generate a second resultant signal of the multiplication and, in accordance with the generated second resultant signal of the multiplication, demodulates the second reception signal into a second baseband signal; and
   second estimation circuitry that, in accordance with the second baseband signal and the beam control signal, estimates an emission angle of a beam as a second azimuth angle at which the object is present.

6. The radar system according to claim 1, wherein:
the first radar device further includes a first reception antenna that receives reflected waves obtained when the first transmission signal is reflected by the object as a first reception signal, and detects a position of the object in accordance with the first reception signal and the first transmission signal, and
the second radar device further includes a second reception antenna that receives reflected waves obtained when the second transmission signal is reflected by the object as a second reception signal, and detects the position of the object in accordance with the second reception signal and the second transmission signal.

7. The radar system according to claim 6, further comprising:
a fault determination circuitry that, in a case where emission areas of the beams of the first transmission antenna and the second transmission antenna overlap each other, in accordance with a detection result of the first radar device and a detection result of the second radar device, determines that the radar system is faulty when one of the first radar device and the second radar device detects the object in a region in which the emission areas overlap and the other of the first radar device and the second radar device does not detect the object in the region.

8. A radar system comprising:
a first transmission antenna that emits a beam carrying a first transmission signal to detect an object;
a second transmission antenna that emits a beam carrying a second transmission signal to detect the object;
control circuitry that generates a beam control signal to perform scanning by switching emission directions of the beams emitted from the first transmission antenna and the second transmission antenna so that the beams emitted from the first transmission antenna and the second transmission antenna overlap each other at random timings;
first beam formation circuitry that forms the beam emitted from the first transmission antenna in accordance with the beam control signal; and
second beam formation circuitry that forms the beam emitted from the second transmission antenna in accordance with the beam control signal.

9. A radar system comprising:
a first transmission antenna that emits a beam carrying a first transmission signal to detect an object;
a second transmission antenna that emits a beam carrying a second transmission signal to detect the object;
control circuitry that generates a beam control signal to perform scanning by switching emission directions of the beams emitted from the first transmission antenna and the second transmission antenna so that the beams from the first transmission antenna and the second transmission antenna overlap each other at a plurality of timings in a period between emission of the beam emitted from the first transmission antenna in a predetermined emission direction and subsequent emission of the beam emitted from the first transmission antenna in the predetermined emission direction;
first beam formation circuitry that forms the beam emitted from the first transmission antenna in accordance with the beam control signal; and
second beam formation circuitry that forms the beam emitted from the second transmission antenna in accordance with the beam control signal.

10. The radar system according to claim 9, wherein the beam control signal causes a combination of the emission directions in which the beams of the first transmission antenna and the second transmission antenna overlap each other and a combination of the emission directions in which the beams of the first transmission antenna and the second transmission antenna do not overlap each other to be alternately switched.

* * * * *